US008218153B2

(12) United States Patent
Kostka et al.

(10) Patent No.: US 8,218,153 B2
(45) Date of Patent: Jul. 10, 2012

(54) APPARATUS AND METHOD FOR IMPROVING THE MEASUREMENT ACCURACY OF DIGITAL 3D GEOMETRICAL MEASUREMENT SYSTEMS

(75) Inventors: Guenther Kostka, Erlangen (DE); Peter Schmitt, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 229 days.

(21) Appl. No.: 12/519,098

(22) PCT Filed: Dec. 12, 2007

(86) PCT No.: PCT/EP2007/010900
§ 371 (c)(1),
(2), (4) Date: Dec. 21, 2009

(87) PCT Pub. No.: WO2008/071414
PCT Pub. Date: Jun. 19, 2008

(65) Prior Publication Data
US 2010/0085577 A1  Apr. 8, 2010

(30) Foreign Application Priority Data
Dec. 15, 2006 (DE) .......................... 10 2006 059 416

(51) Int. Cl.
*G01B 11/24* (2006.01)
(52) U.S. Cl. ...................................... 356/603
(58) Field of Classification Search ........................ None
See application file for complete search history.

(56) References Cited

U.S. PATENT DOCUMENTS

| 5,248,876 | A  | * | 9/1993 | Kerstens et al. | .......... 250/559.05 |
| 6,449,048 | B1 | * | 9/2002 | Olszak | ........................... 356/497 |
| 7,351,969 | B2 | * | 4/2008 | Watanabe et al. | ............. 250/310 |
| 2006/0070417 | A1 | | 4/2006 | Nieminen et al. | |

FOREIGN PATENT DOCUMENTS

| DE | 19721688 | 9/1998 |
| EP | 0486701 | 5/1992 |
| EP | 1524492 | 4/2005 |

OTHER PUBLICATIONS

Yang, et al.: "Analysis of errors in dimensional inspection based on active vision" Proceedings of SPIE, vol. 2354, Oct. 1994, pp. 96-104, XP002473955.
Kuo, et al.: "Development of a High-Precision Surface Metrology System and its Uncertainty Analysis"; Jul. 10-12, 2005; ICM '05 IEEE International Conference on Mechatronics; Taipei, Taiwan, pp. 945-952, XP010848072 ISBN:0-7803-8998-0.
English Translation of International Preliminary Report on Patentability Chapter II, Jun. 30, 2009, 11 pages.

* cited by examiner

*Primary Examiner* — Tu Nguyen
(74) *Attorney, Agent, or Firm* — Glenn Patent Group; Michael A. Glenn (57) ABSTRACT

The resolution of an optical measurement system for measuring a surface of an object, wherein a measurement light strip is captured on a surface of an object by means of a matrix sensor with a resolution limited by quantization in a quantization direction, can be improved by calculating an effective mapping location in the quantization direction on the basis of the associated real mapping location and a further real mapping location adjacent to the associated real mapping location in a direction perpendicular to the quantization direction.

17 Claims, 7 Drawing Sheets

APPARATUS AND METHOD FOR IMPROVING THE MEASUREMENT ACCURACY OF DIGITAL 3D GEOMETRICAL MEASUREMENT SYSTEMS

BACKGROUND OF THE INVENTION

The present invention relates to measuring the geometry of 3-dimensional objects, and particularly measuring their surfaces, and a method and an apparatus for improving the measurement accuracy of such methods.

The three-dimensional measurement of objects or surfaces of objects has a multiplicity of applications in industrial production. In particular, for inspecting production results, methods enabling a quick quality check are employed here, such as the shape measurement of motor vehicle brake discs or the measurement of motor vehicle tires with respect to a possible vertical or lateral run-out.

By means of three-dimensional geometrical measurement methods, moreover, mechanical vibrations of surfaces, for example, may be determined or the thickness of materials produced in several sheets, such as sheet metal or paper, can be measured. While some applications aim to determine the exact geometrical shape of the surface of an object, other methods rather aim at checking the compliance with a parameter in only one geometrical dimension. With smooth surfaces, for example, it is mostly of interest as to whether the surfaces have a roughness or ripple below a certain limit value. In general, for example, a smooth surface could even be defined by the fact that the lateral structuring of the surface is significantly less than the desired measurement accuracy in the direction of the surface normal.

The quick detection, measurement and checking of the geometry of industrially manufactured products is an important field of application of contactless 3D measurement systems, as already mentioned. Usually, such systems are digital, i.e. they use digitized measurement values from measuring elements in a finite resolution of digitization. Quantization errors may be caused, on the one hand, by the digitization of originally analog measurement values, or by per-se quantized detectors, such as CCD cameras.

Standard methods for measuring surfaces here are the tactile shape measurement working point by point by way of mechanical measurement probes scanningly guided across the surface of the object to be measured. Another high-resolution method is laser triangulation. The great disadvantage of these methods here consists in the fact that the surface of the object has to be scanned point by point, i.e. in a rastered fashion, which is extremely time-consuming. Due to the extremely high measurement speed achievable, the light-slit method is increasingly gaining importance in 3D shape detection. In the light-slit method, a measurement light strip or measurement strip is projected onto a surface of the object to be measured, and the measurement light strip at the same is recorded by a camera or a comparable detector. The topography of the object to be measured can be inferred from the location of the measurement light strip in the camera image if the geometry between the object, the camera and the measurement light projector is known. The advantage of this method, above all, is the simultaneous parallel detection of a complete height profile along a line. The fact that a line can be measured in a single measuring step opens up the possibility of completely scanning and measuring a complete object in a short time by simple translational or rotational movements of the object and/or the measurement system in connection with measuring steps in close temporal succession. Typical measuring times needed for the capture of the entire object here amount to seconds. The achievable measurement accuracy is less than in the laser triangulation methods or the time-consuming geometric detection by means of tactile measurement probes, particularly in the case of very expansive objects. This is due to the basic functioning of the light-slit principle. A laser line or light line projected onto the object is detected by a parallactically tilted measuring camera by means of an image sensor with a finite number of picture elements (pixels). By way of the detection and digitization of the geometrical information by means of the determination of the coordinates of the light line on the sensor chip, a resolution or height resolution of such a light-slit method, which is limited by the sensor resolution (finite pixel dimension), results in a direct way. Typical pixel numbers in one dimension here range from 1,000 to 2,000. Thus, if the entire geometrical area of the chip in one dimension is used for height measurement, which necessitates precise adjustment of the geometry, a digitization resolution of such a system ranges from 1:1,000 to 1:2,000 due to the finite pixel number on the chip. The physically available height measuring range thus is divided into 1,000 to 2,000 values. Thus, a measurement resolution of 0.1 mm is achieved in a basically geometrically possible height measurement range of, for example, 100 mm.

The exact geometrical dimensioning here usually is limited additionally by the devices used, such as the CCD used, or the optical elements used for mapping. In particular, in a system with a given optical mapping property, the adjustment of the height measurement range is not completely independent of the chosen lateral width of the scanned measurement area on the object. A square CCD with 1,000×1,000 pixels may serve as an example. In the shape detection of a typical flat object, such as the surface of a brake disc, a lateral measurement width of 50 mm is needed, for example. In addition, height measurement accuracy of a few micrometers is demanded. Due to the demanded width, however, the mapping optics is to be adjusted so that the CCD maps an area of 50 mm×50 mm if the object is observed perpendicularly. This leads to a height resolution of a maximum of about 50 μm. With brake discs, however, height measurement accuracy of few micrometers is demanded, which cannot be achieved directly with such a system due to the above considerations.

As already described, since the height resolution of light-slit measurement methods depends on the geometry and/or the relative orientation of the camera with respect to the surface of the object and to the light projection means, among other things, the height resolution can be increased by limiting the basically available height measurement range. This can be achieved by arranging the laser so that the laser fan beam is incident on the object surface in a very flat and brushing manner (for example at 80° with respect to the surface normal), and at the same time the measurement camera is positioned perpendicularly thereto rather in vertical direction. Due to the geometry, a slight change in height on the surface of the object to be examined thus leads to a strong change in the position of the projected light strip. However, such an arrangement also leads to the fact that the position of the light-slit on the surface greatly depends on the object height and thereby "migrates" laterally when the object height changes. The above-described configuration with a very flat angle of incidence of the laser beam also leads to a very small working distance between the measuring means and the object surface, which is often not desired or possible due to the spatial situation and the safety measures needed (minimum distance of the measurement technology from the object).

In general, it is to be noted that such strong limitation of the basically available height measuring range is not advantageous and desired for industrial applications since, thereby, there is hardly any more flexibility in the application on different surfaces to be measured.

So as to increase the measuring speed of light-slit measurement systems, typically a specialized sensor permitting the signal evaluation already on the sensor chip itself is employed. Usually, to this end a preferential direction is defined on the sensor, in which the mapping of the height information of the light strip is expected on the sensor, or the sensor is adjusted so that the mapping of the light measurement strip migrates in the sensor preferential direction on the sensor. The evaluation of the measurement data on the sensor is then implemented so that, per pixel column in a preferential direction, exactly one mapping location is defined, which corresponds to the coordinate of the brightest pixel in the accompanying column. Hence, the height resolution is automatically limited by the quantization of the spatial resolution of the sensor. So as to further increase statistical fluctuations (photonic statistics) and hence the height resolution, a plurality of detection threshold values for determination of the coordinates of the light line on the sensor chip can be used in such a chip, whereupon the final coordinate is determined by averaging the coordinates determined by means of the different threshold values. Such methods have recently become available in the latest generation of light-slit cameras, for example by the company Sick-IVP. However, this leads to the fact that the available measuring frequency is effectively decreased significantly. Moreover, only in some few cases does such a method lead to a real increase in height resolution.

In principle, the resolution on a sensor, independent of the fact as to whether it has discrete sensor elements or not, can be determined algorithmically by way of forming a center of gravity of the light distribution on the image sensor detected by the sensor. In technology, this method is also known as the COG (center-of-gravity) method. In principle, with such a method it is possible to increase the accuracy with which the image of the light-slit measurement strip can be detected on the sensor area almost arbitrarily. In reality, due to technical limitations, such as the finite dynamic range of individual CCD pixels, improvements in resolution are possible up to a maximum of a factor of 10. The computational operations for this typically are intensive in computation time, such as the adaptation of suitable parameterizations by means of a least-square fit. Hence, these mostly have to be executed on a downstream computer and/or dedicated hardware. Like the methods for increasing resolution discussed above, this leads, in general, to a clear reduction in the maximum measuring speed possible.

Moreover, for executing the COG method, it is a mandatory prerequisite that the measurement light strip illuminates several pixels on a pixel sensor in preferential direction, the needed minimum width of the projected laser light line on the object thus automatically decreasing the achievable spatial resolution on the surface of the object to be measured. More generally speaking, there are certain limiting conditions regarding the needed width of the projected laser light line on the object if the improvement of the resolution is to be achieved by means of the COG method by using a multiplicity of sensor pixels for the evaluation.

As already mentioned above, light-slit sensors generally have a multiplicity of individual measurement tracks or pixel columns providing geometrical measurement values at the same time. A combination of several such measurement tracks to an effective new (wider) measurement track or the combination of data captured successively in time by means of averaging, i.e. reduction of the lateral resolution, generally also only leads to improvement in the statistical behavior of the measurement, i.e. to reduction of the standard deviation of several successive measurements or to improvement in the reproducibility of the measurement, but not to improvement in the measurement accuracy. Such measures do not influence the real mapping location of the measurement light strip on the sensor surface, which causes quantization of the possible coordinates due to its constructional principle. Figuratively speaking, for example, it would be the same (wrong, since only roughly resolved) measurement value that would be averaged, which in turn would lead to a faulty measurement value. As illustrated above, there are a series of approaches trying to improve the spatial resolution and/or the height resolution of a 3D geometrical measurement system, but with all these entailing the disadvantage of significantly prolonging the measurement duration needed.

SUMMARY

According to an embodiment, an optical measurement system for measuring a surface of an object may have: a definer for defining a radiation plane, in order to generate a measuring strip on the surface of the object; a matrix sensor with a resolution limited in a quantization direction by quantization, in order to acquire real mapping locations of the measuring strip on the sensor in the quantization direction and a direction perpendicular thereto, by making a capture of the measurement strip generated on the surface; and an evaluator formed to acquire an effective mapping location in quantization direction on the basis of the associated real mapping location and at least one further real mapping location adjacent to the associated real mapping location in the direction perpendicular to the quantization direction.

According to another embodiment, a method of measuring a surface of an object may have the steps of: defining a radiation plane to generate a measurement strip on the surface of the object; making a capture of the measurement strip generated on the surface, in order to generate real mapping locations of the measurement strip in a quantization direction and a direction perpendicular thereto at a resolution limited by quantization in a quantization direction; acquiring effective mapping locations in quantization direction on the basis of an associated real mapping location and at least one further real mapping location adjacent to the associated real mapping location in the direction perpendicular to the quantization direction.

According to another embodiment, a method of improving the resolution of a light-slit measurement system having a definer for defining a radiation plane, in order to generate a measuring strip on the surface of the object; a matrix sensor with a resolution limited in a quantization direction by quantization, in order to acquire real mapping locations of the measuring strip on the sensor in the quantization direction and a direction perpendicular thereto, by making a capture of the measurement strip generated on the surface; and an evaluator formed to acquire an effective mapping location in quantization direction on the basis of the associated real mapping location and at least one further real mapping location adjacent to the associated real mapping location in the direction perpendicular to the quantization direction, may have the steps of: varying an angle between a mapping direction of the measurement strip on the matrix sensor and the quantization direction; and checking as to whether the effective mapping location lies within an interval around a physical mapping location of the measurement strip.

The present invention is based on the finding that the resolution of an optical measurement system for measuring a surface of an object, in which a measurement light strip or measurement strip on the surface of an object is captured by means of a matrix sensor having a resolution limited by quantization in a quantization direction, can be improved by computing an effective mapping location in the quantization direction on the basis of the associated real mapping location and a further real mapping location associated with the real mapping location in a direction perpendicular to the quantization direction.

Objects having planar surfaces can be measured in a particularly advantageous way, so that they do not exhibit any height jumps on the surface, or the surface profile of which does not have any steep gradients.

Here, the increase in the height resolution is achieved by the application of an inventive special arrangement of the measurement-technology component with respect to the object to be measured and corresponding data processing, wherein a method similar to the vernier principle is employed.

In one embodiment of the present invention, when measuring planar surfaces, a reduction in resolution in a lateral direction, i.e. in the direction in parallel to the light-slit direction, therefore is accepted intentionally so as to thereby increase the height resolution by producing an effective mapping location of the measurement light line on the sensor by averaging mapping locations of the measurement light line adjacent in a lateral direction on the sensor. Like in a further embodiment of the present invention, if the geometrical arrangement is chosen such that, in the case of a perfectly planar surface, the measurement light strip is not parallel to the preferential direction and/or parallel to the row or column direction of the sensor, significant improvement of the resolution can be achieved in the case of a suitable choice of the angle between the lateral direction of expansion of the measurement light strip and the sensor axes. This is due to the fact that laterally adjacent columns and/or measurement tracks of the sensor, in the case of a geometry chosen in this way, measure different mapping locations in the quantization direction (the direction in which the height information is determined) even in the case of a completely planar surface. By way of averaging laterally adjacent mapping locations, the resolution may thus be improved via the intrinsic sensor resolution, which is given by the pixel sizes. If the angle between the lateral expansion of the light measurement strip and the quantization direction of the sensor is adjusted suitably, the height resolution of the measurement system can be improved significantly, so that improvements in resolution by more than a factor of 10 are possible.

In other words, the measurement accuracy of digital 3D geometric measurement systems such as the laser light-slit method, can be improved by tilting the surface to be measured with respect to the basic measurement direction of the measurement arrangement (e.g. the light-slit) in a suitable manner and arithmetically averaging several adjacent measurement values. The exact way of tilting and/or the effects achieved by the averaging of neighboring measurement values will be explained in greater detail in the following.

BRIEF DESCRIPTION OF THE DRAWINGS

Embodiments of the present invention will be detailed subsequently referring to the appended drawings, in which.

DETAILED DESCRIPTION OF THE INVENTION

Since the concept for improving the resolution of 3D measurement systems according to the invention will mainly be discussed on the basis of an example of a light-slit measurement method in the following paragraphs, the functioning of a standard light-slit method shall be explained briefly in the following on the basis of FIG. 10.

Figure 10:
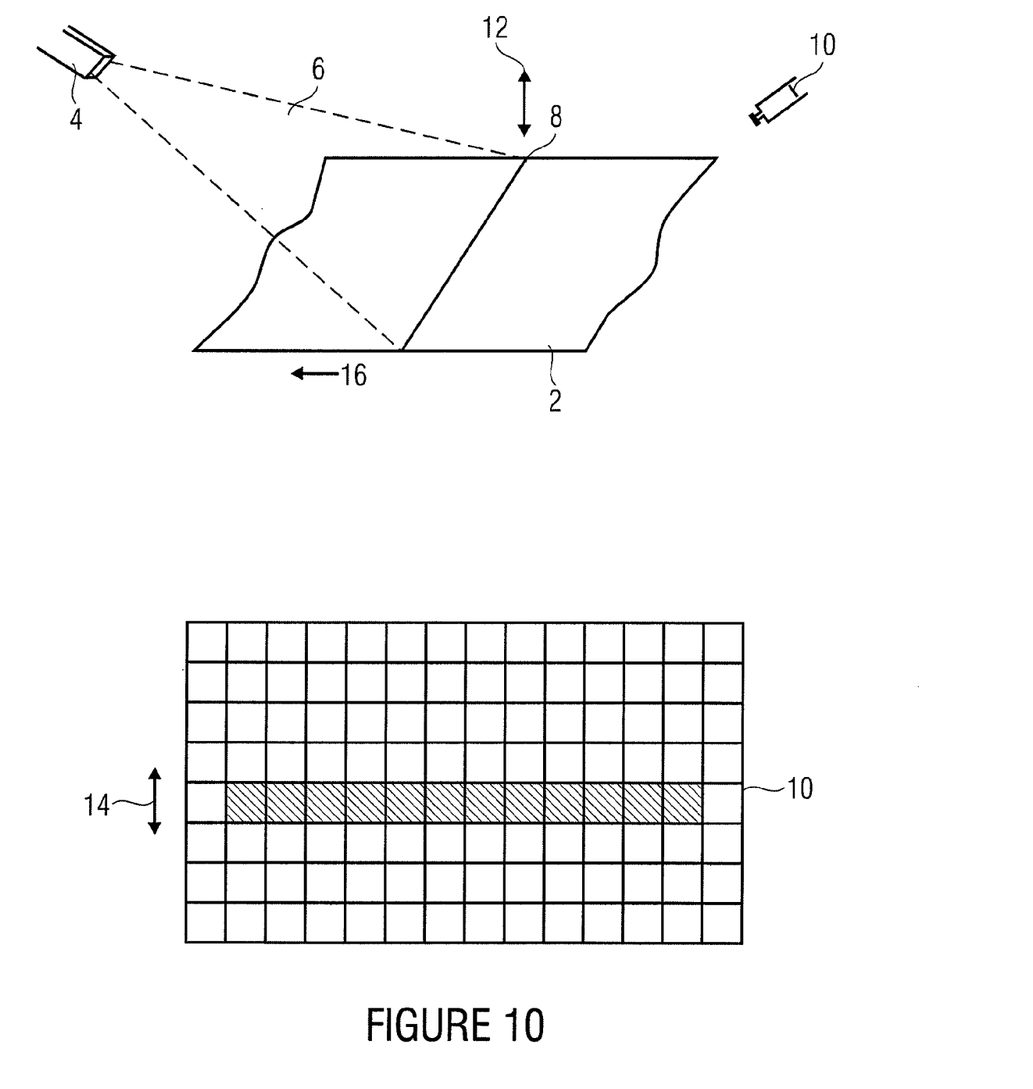
FIG. 10 is an illustration of a light-slit measurement method.

FIG. 10 shows the surface of an object 2 to be measured, a measurement light projector 4, which emits light and/or radiation in a light plane or radiation plane 6, so that a measurement light strip 8 is generated on the surface of the object 2. In the case of a perfectly planar surface 2 shown in FIG. 10 in a simplified manner, the measurement light strip 8 is the straight line shown in FIG. 5.

The measurement light strip 8 is recorded by means of a suitable sensor 10. In the example shown in FIG. 5, the sensor 10 is a two-dimensional matrix sensor, such as a CCD or a CMOS sensor. The exact type of the sensor is not relevant for the functioning of the inventive concept, but also other types of sensors can be used, in general.

Figure 5:
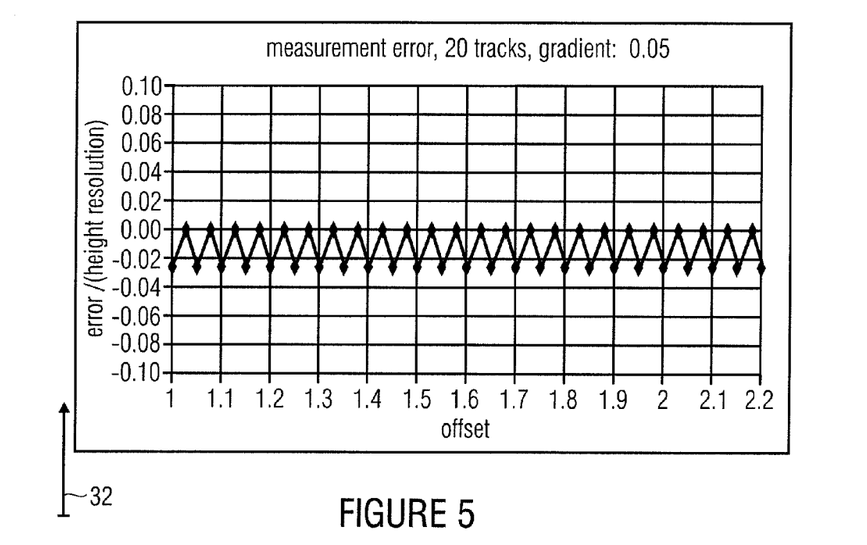
FIG. 5 is an illustration of the dependence of the improvement in resolution on the number of mapping locations to be taken into account.

If a measurement light line 8 is generated as a straight line on the surface 2 of the object, the image of the straight line, as shown in FIG. 5, is mapped on the sensor 10. The height information now results from the geometry of the overall construction, in particular from the relative position of the sensor 10 and of the measurement light projector 4. For example, if the surface 2 of the object is moved in a direction 12, the measurement light strip is generated at another position on the surface 2 of the object, since the light plane 6 remains unchanged in space. Since the sensor 10 also is stationary, the image of the measurement light line (symbolized by black squares) on the sensor will also vary in a direction 14. When the geometry of the light plane 6 and the sensor 10 is known, the position of the surface 2 of the object in the direction 12 can be inferred, as described above.

Equivalent considerations apply when the surface of the object is not planar. By means of the light-slit method shown in FIG. 10, topography information and/or height information thus can be determined across the entire width of the surface 2 by means of a single capture of the sensor 10.

For light-slit measurement methods, specialized sensors 10 are used, which are capable of performing signal processing themselves at high speeds, so that they only make available the information on the brightest illuminated pixel of the sensor 10 as a measurement result, for example. Such highly specialized sensors are, therefore, particularly suited for quick measurement, since intensive signal post-processing, such as is needed in a conventional CCD, can be avoided.

In summary, light-slit measurement methods have the significant advantage that the height information along a measurement line 8 expanding in space can be obtained at high speed.

If the surface 2 is moved in a direction perpendicular to the measurement light line 8 and in a direction 16 below the light plane, and successive captures are performed by means of the sensor 10, the entire topography of the surface 2 of the object to be examined can be determined within a short time, which makes the light-slit measurement method predestined for employment in measuring surfaces expanding in space.

Figure 1:
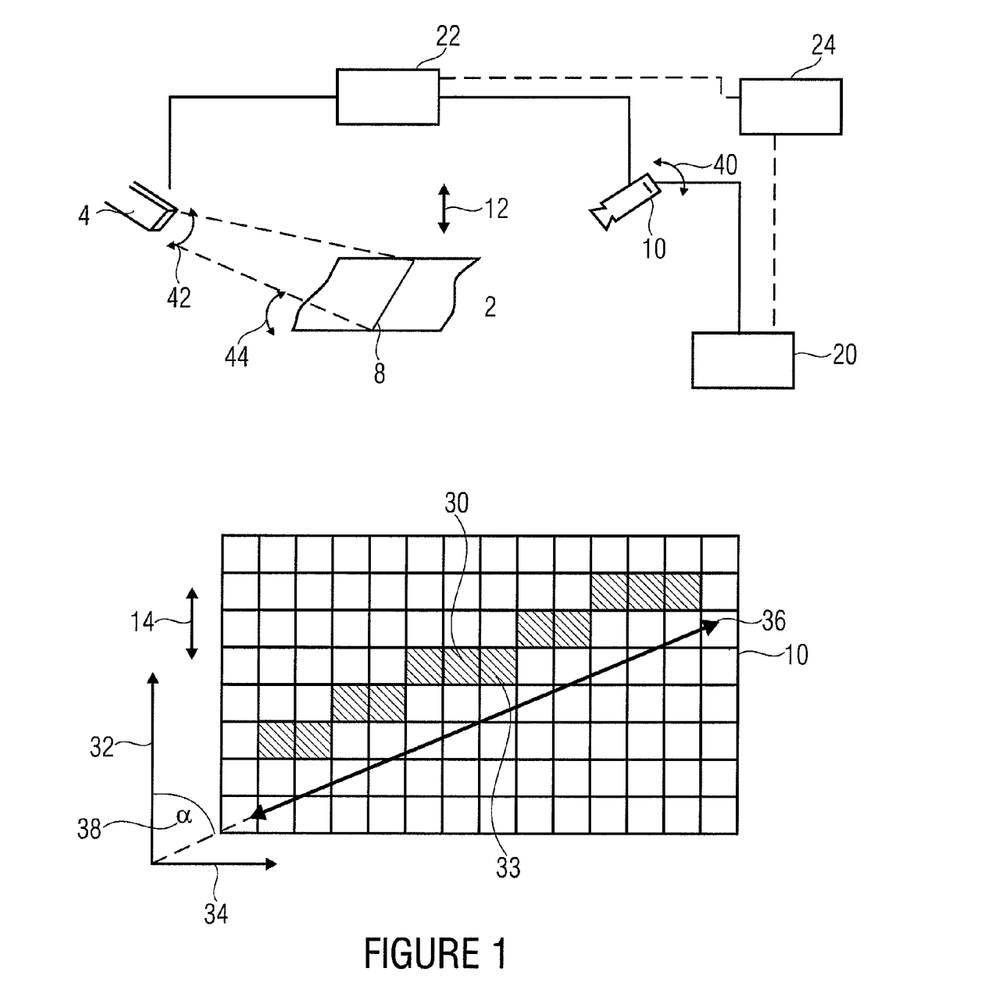
FIG. 1 shows an embodiment of an optical measurement system according to the invention.

FIG. 1 shows an embodiment of an optical measurement system for measuring a surface of an object 2, according to the invention.

The means 4 for defining a light plane 6, (light projector 4), as well as the measurement light strip 8 generated on the surface of the object 2 are illustrated. Although not being part of the inventive apparatus and/or the inventive optical measurement system, the object 2 is illustrated here for better understanding. Moreover, for the following considerations, it will be assumed, in a simplifying manner, that the surface of the object 2 is perfectly planar. Furthermore, a sensor or matrix sensor 10 is illustrated, which may, for example, be built inside a camera and serves to detect the mapping locations of the measurement light strip 8 on the surface of the matrix sensor 10, which will be referred to as real mapping locations in the following. The optical measurement system according to the invention further has evaluation means 20 obtaining and further processing the real mapping locations of the sensor so as to derive effective mapping locations from the real mapping locations, and hence, as described in detail further below, improve the height resolution of the optical measurement system shown in FIG. 1. FIG. 1 further shows an optional resolution improvement means 22, which may be connected to the light projector 4, the matrix sensor 10 or the object 2 and/or a means carrying or supporting the object. Furthermore, FIG. 1 illustrates optional calibration means 24 connected to the evaluation means 20 and the resolution improvement means 22.

In one embodiment of the present invention, the real mapping locations of the measurement light strip on the sensor, which are illustrated as pixels in hatching in the enlarged illustration of the matrix sensor 10, are processed by the evaluation means, and effective mapping locations resulting in an improvement in the height resolution of the optical measurement system of FIG. 1 are computed.

To this end, as shown in FIG. 1, an effective mapping location associated with a real mapping location 30 is determined in a quantization direction 32 by taking at least one further real mapping location 33 adjacent to the real mapping location 30 in a direction 34 perpendicular to the quantization direction 32 into account for the determination of the effective mapping location.

In one embodiment of the present invention, a group of further real mapping locations symmetrically arranged around the real mapping location 30 are used to determine the effective mapping location, which is associated with the real mapping location 30, by averaging all real mapping locations considered.

Resolution improvement may now be achieved by the height resolution of the measurement systems shown in FIGS. 10 and 1, as was already explained on the basis of FIG. 10, being limited both by the geometry of the arrangement and by the intrinsic quantization of the matrix sensors used. In FIGS. 1 and 10, the quantization in the quantization direction 32 here is the limiting factor, since it substantially determines the height coordinate, i.e. contains the information as to how far the object 2 is shifted in the direction 12 and/or to what extent the topography of the object 2 varies in a direction 12. Resolution improvement may then be achieved if a mapping direction 36 of the measurement light strip 8 on the matrix sensor 10 does not pass perpendicularly to the quantization direction 32, in contrast to conventional technology, but forms a predetermined angle 38, which is freely adjustable in some embodiments of the present invention, with the same.

So as to vary and/or adjust the angle 38, it is possible, in principle, to rotate the matrix sensor 10 in accordance with a first rotation direction 40 by means of the resolution improvement means 22. Alternatively, the light plane 6 may be rotated about a rotation direction 42, or the object 2 about a rotation direction 44.

How the height resolution of the optical measurement system shown in FIG. 1 can be improved according to the invention will be explained in greater detail in the following on the basis of FIGS. 2 to 7, with mapping locations of the measurement light strip on a two-dimensional matrix sensor 10 being illustrated schematically in the figures discussed in the following.

Figure 2:
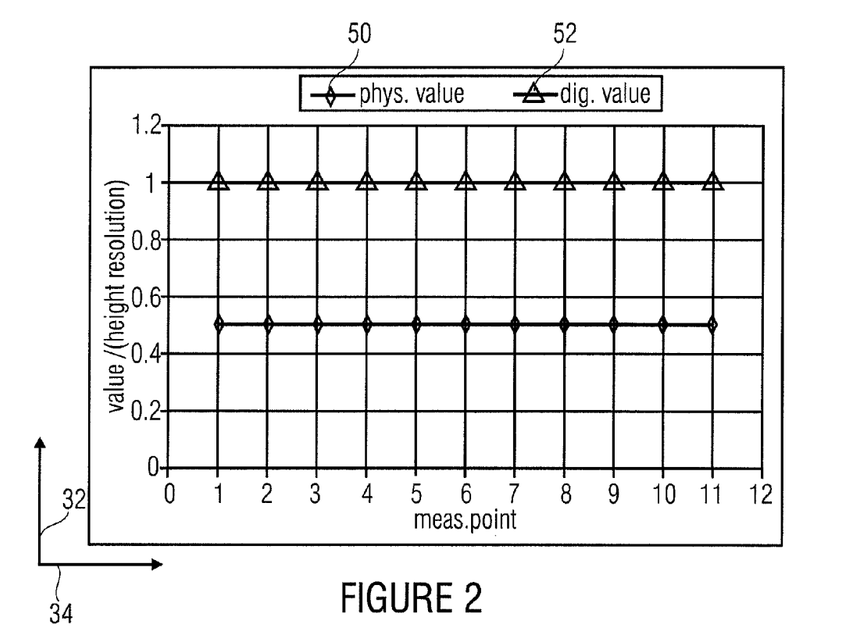
FIG. 2 is a schematic illustration for illustrating the measurement error.
Figure 3:
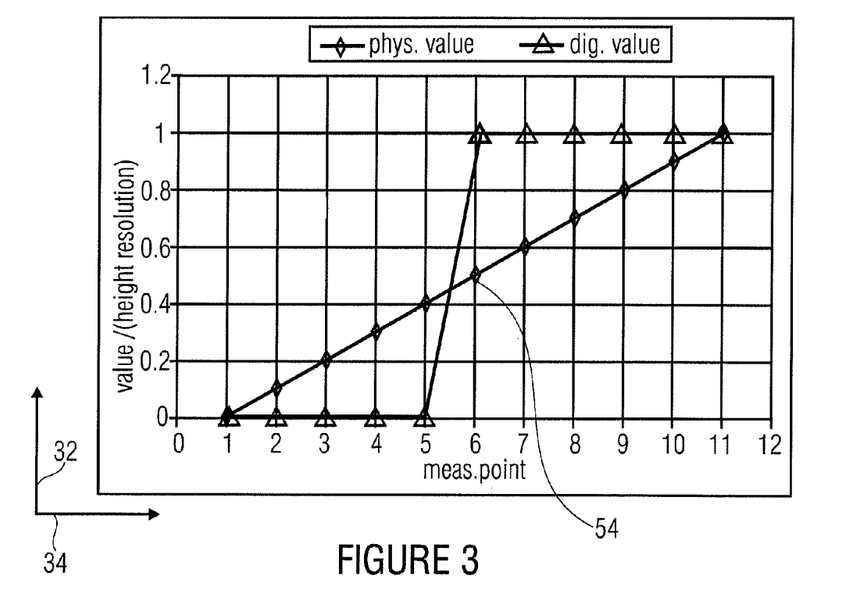
FIG. 3 is a schematic illustration of the concept according to the invention for reducing the measurement error.

FIGS. 2 and 3 here show mapping locations of the light measurement strip 8 on the sensor surface in a two-dimensional illustration, wherein the number of the pixel columns considered is plotted in a direction 34 and wherein the coordinate in quantization direction 32 is plotted in units of pixels in quantization direction 32. FIGS. 2 and 3 thus show simulations of real measurement situations, wherein physical mapping locations 50 are characterized with open rhombs, and real mapping locations output by the sensor 10 in a digitized manner by open triangles 52. The physical mapping locations 50 thus designate the actual mapping location of the measurement light strip 8 generated on the sensor surface, as it is generated by the optics of a camera on the sensor surface 10, for example. Measurement errors by way of quantization thus result from the difference of the coordinate of the physical mapping locations 50 and the real mapping locations 52 in quantization direction 32.

FIG. 2 shows a simulated measurement situation for the case that the digitization resolution of the 3D measurement technology corresponds to a scale unit on the vertical axis of the diagram (quantization direction 32). The measurement data of several measurement tracks (columns of the matrix sensor 10) are plotted horizontally (direction 34). The surface to be measured (real physical value) in this example is horizontal and is parallel to the resolution raster of the camera, i.e. the quantization direction 32 is perpendicular to the mapping direction of the measurement light strip 8. If the surface, as shown in FIG. 2, is at the height value of 0.5 (in relative quantization units), the digitized height values, i.e. the real mapping locations provided from the sensor 10, are at a constant value of 1 because of the finite digitization resolution and the rounding of the measurement value induced thereby, as is illustrated in FIG. 2. In the configuration shown in FIG. 2, the measurement error thus is maximum and at 0.5, i.e. half a resolution step and/or quantization quantity. Generally speaking, there is a measurement accuracy of ±0.5 in this case. If the mean value across several neighboring points, for example across all 11 measurement values illustrated, is used as the measurement value, the error does not change at all, since all values contain the same measurement error. Among other things, this can be seen from the fact that, in methods corresponding to the conventional technology as illustrated in FIG. 10, an increase in the measurement accuracy cannot be achieved this way. In addition, it is to be noted that the actual height resolution, i.e. the accuracy with which the surface can be measured in absolute physical units, also depends on the geometry of the optical measurement system. In the following, only the effects allowing resolution improvement on the surface of the matrix sensor 10 will be discussed.

As shown in FIG. 3, for example, if the measurement apparatus is tilted with respect to the surface of the object 2 about the central measuring point 54 (measuring point no. 6) and the arithmetic mean value across 10 neighboring measuring points is used as the effective measurement value and/or effective mapping location for the central measuring point 6, a new value providing a substantially better match with the actual physical height value 54 is obtained. This results from the fact that some measurement values become "0", and some measurement values "1", by way of the inherent quantization of the matrix sensor 10. The tilting of the mapping direction 36 of the measurement light strip 8 illustrated schematically in FIG. 2 may here be effected by several rotations about rotation directions 40, 42 or 44 described in FIG. 1.

The effective mapping location thus generated of the measuring point 6 here depends on the angle 38 of the tilt. If the tilt is adjusted so that, as shown in FIG. 3, the gradient of the tilt (in arbitrary units) is 0.1, i.e. that the real physical value and/or mapping location at the eleventh measuring point has increased by exactly one height resolution step laterally (i.e. in the direction 34), for example, and if neighboring measurement values are averaged, an error to the physical mapping location 54 of about ±0.5 results. As compared with the example shown in FIG. 2, the height resolution thus is improved by about a factor of 10 with respect to the case without tilt.

By adjusting the angle 38, the measurement accuracy thus can be increased. Moreover, the increase in accuracy is also influenced by the number of real mapping locations and/or measuring points used for averaging. Thus, a further increase in measurement accuracy can be achieved if tilt and averaging are chosen correspondingly. Thus, increases in resolution by factors of 20 or 100 are easily possible. In principle, a height measurement accuracy lying below the optical resolution boundary of about 1 μm can be achieved even if the resolution of the individual point in quantization direction is worse by more than one order of magnitude. In optical measurement systems in conventional technology, such high geometrical measurement accuracies can be achieved only by utilizing optical interferences, such as in interferometers.

The inventive concept has the particular advantage that the measurement frequency of the overall system and/or the sensors and/or matrix sensors used does not have to be reduced, even though the resolution can be improved significantly altogether. It is to be noted that the method illustrated leads to a corresponding reduction in the lateral resolution, i.e. the resolution in the mapping direction 36 of the measurement light strip 8. Yet, this may be accepted in those cases in which the measurement task is the detection of smooth objects that are little structured laterally. In common light-slit sensor cameras, the number of pixels and/or measuring points in a lateral direction usually ranges from 1,000 to 2,000 measuring points and/or pixels. Oftentimes, such a great number of measuring points across the area to be detected, i.e. such a high density of measuring points in the lateral direction, is not necessary. Hence, a corresponding reduction in the lateral spatial resolution may easily be accepted in favor of the increase in height resolution, particularly when objects are to be examined, which objects cannot have any height jumps at short distances, in principle, because the manufacturing method prevents such errors, for example.

Figure 4:
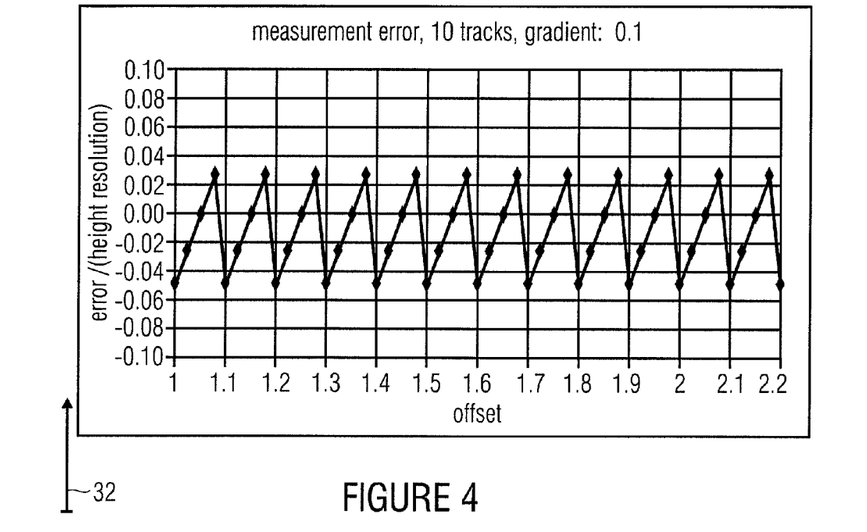
FIG. 4 is a schematic illustration of the dependence of the improvement in the resolution on the change in geometry.

As described above, in case of a constant gradient of the tilt, as is illustrated in FIG. 3, for example, the achievable measurement accuracy is dependent on the actual height of the object, i.e. the offset between the object and the measurement setup. Moreover, the achievable accuracy is dependent on the number of further real mapping locations used for averaging. This dependency is illustrated in FIGS. 3 and 4, which illustrate the dependency of the measurement error on the offset, wherein both parameters, i.e. both the gradients (tilting angle 38) and the number of mapping locations used for averaging, are varied between FIGS. 3 and 4. FIGS. 3 and 4 here show the offset on the X axis, i.e. a common shift of all physical mapping locations in FIG. 3 in units of pixel resolution, as well as the errors resulting therefrom when determining the measurement error of the sixth measuring point 54 of FIG. 3 on the Y axis.

For FIG. 3 the chosen gradient is 0.1, and averaging is done across ten neighboring values. The measurement simulation shows that a mean measurement error of ±0.031, which may be −0.05 or +0.025 in the extreme case, is to be expected in this configuration independently of the offset.

In the configuration shown in FIG. 5, in which 20 neighboring real mapping locations are averaged and which is based on a gradient of 0.05, a mean measurement error of 0.018 is obtained, with maximum error amplitudes of −0.025 and +0.0. Thus, this corresponds to about half the measurement error, as is illustrated in FIG. 4.

By applying the inventive concept, it is thus possible to adjust the measurement error of a light-slit method to the tolerances needed in an extremely flexible way. Here, the significant improvement in the measurement accuracy and/or increase in height resolution shown on the basis of FIGS. 4 and 5 can be achieved alone by the fact that the gradient and/or angle 38 is optimized and that the number of neighboring real mapping locations used for averaging is varied suitably, if needed.

So as to limit the lateral resolution reduction, the formation of a weighted sum of neighboring real mapping locations may alternatively be substituted for the mere averaging. By way of a suitable choice of the weightings, thus both the height resolution of the system can be improved and the accompanying lateral deterioration of the resolution be adjusted within an acceptable range.

Figure 6:
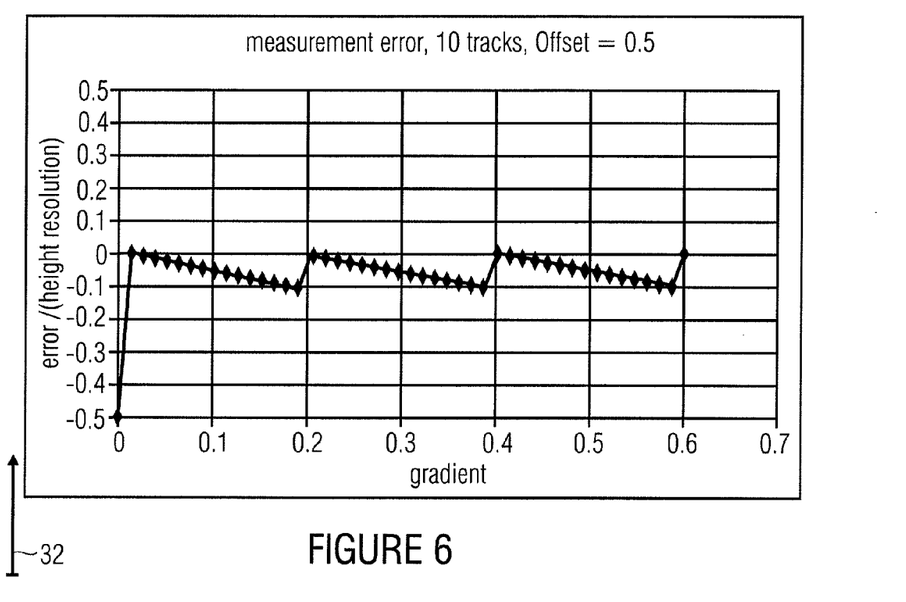
FIG. 6 is a schematic illustration of the dependence of the improvement in resolution on an offset parameter.
Figure 7:
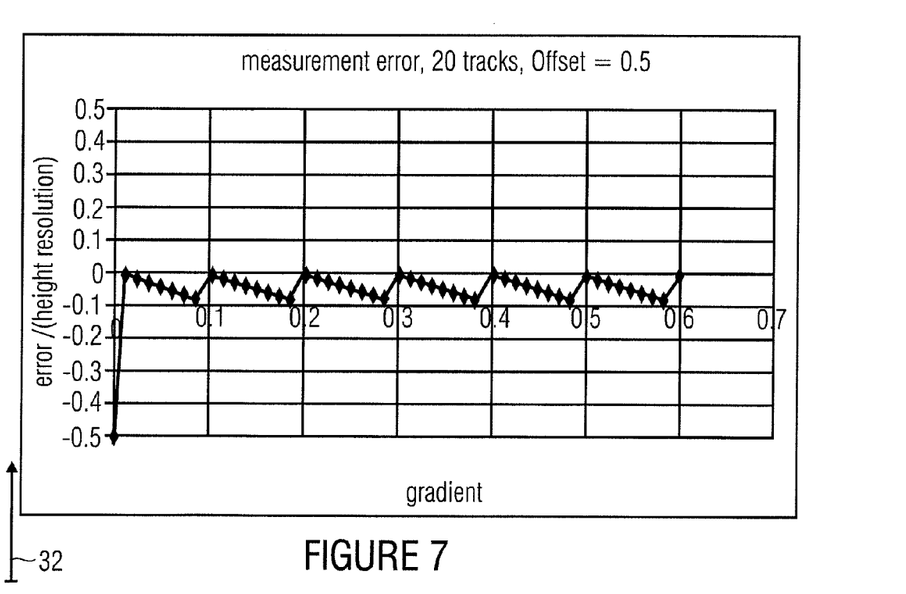
FIG. 7 is a schematic illustration of the achievable improvement in resolution, depending on a further offset parameter.

FIGS. 6 and 7 illustrate the dependency of the measurement error on actually adjusted tilting gradients (angle 38) at a constant height offset value, which is 0.5 in the examples shown in FIGS. 6 and 7. In FIG. 6, it is averaged across ten values here, across 20 in FIG. 7. As can be taken from FIG. 6, the maximum measurement error reduces to 0.049 by way of the averaging across ten values, wherein measurement errors may occur in a range from 0 to 0.094 depending on the amount of the gradient and/or the angle 38. As shown in FIG. 7, further reduction of the measurement error can be achieved by the increase of the number of measuring points used for averaging. In the configuration shown in FIG. 7, the mean error reduces to about half the value as compared with FIG. 6, namely from 0.056 to about 0.022.

Utilizing the dependencies described in detail on the basis of FIGS. 2 to 7, an optical light-slit measurement system and/or a 3D measurement system may be adjusted geometrically until a desired improvement of the expected measurement error has occurred. This adjustment to the geometry of the surface may, in principle, be performed manually when starting up such a system, in case the geometry of the application is not expected to change over time.

Figure 8:
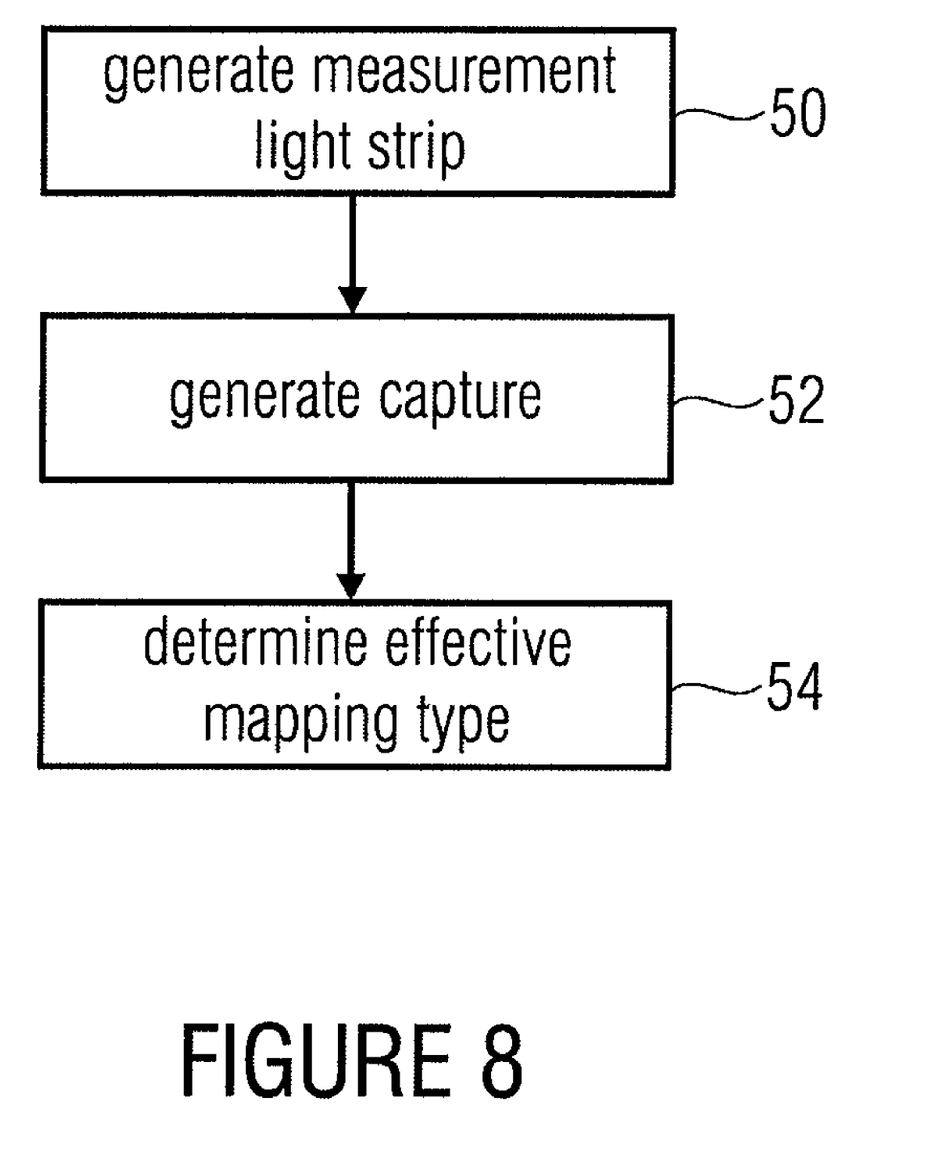
FIG. 8 is a block diagram of a method of measuring the surface of an object, according to the invention.

However, so as to be able to use the method of measuring a surface of an object described on the basis of FIG. 8 flexibly and for several possible cases of application, the optimum alignment of the measurement unit (for example the light-slit measurement unit) with respect to the surface to be sensed is guaranteed by automatic adjustment means and/or a calibration means 24, according to a further embodiment of the invention. As shown on the basis of FIG. 1, the automatic adjustment may be done here by way of motor shifting and/or rotation of the entire measuring head, of parts of an industrially available measuring head, i.e. possibly by rotation of the sensor 10, the light projector 4, or possibly only the light plane 6, by means of suitable optics (possibly using mirrors or micro-mirrors). Alternatively, also the object and/or the object carrier may be rotated along the direction 44. The information on the optimum alignment may be acquired sequentially from preceding measurement data and extrapolated onto the next measuring point to be expected, by calculating the optimum angular position between the surface and the measurement arrangement. Alternatively, a test measurement with all possible configurations can be performed via regular (periodic or aperiodic) tilting of the measurement technology or the light path, in order to achieve optimum adaptation of the angle 38 and/or the further real mapping locations to be used for averaging.

During the measurement itself, also regular periodic or aperiodic tilting of the measurement technology or the light path may be used, wherein in the case of a correspondingly high measurement frequency and temporal oversampling resulting therefrom, only data in which the angle 38 is optimum in the sense of the desired increase in the resolution are used. I.e., only the data with respective optimum adjustment are used. As described in FIG. 1, a calibration means 23 connected to the evaluation means 20 and the resolution improvement means 22 may be provided for such automatic calibration in order to perform the method of improving the resolution of a three-dimensional geometrical measurement system described on the basis of FIG. 9. Such a light-slit measurement system with automatic adaptation of the orientation of the measurement unit with respect to the surface to be measured, using the calibration means 24, is thus already shown in FIG. 1. Here, at first a determination of the optimum adjustment angle is performed on the basis of the recorded data. Subsequent motor adjustment, for example of the measurement unit, to an optimum tilt angle may then be performed for subsequent measurements.

FIG. 8 shows performing the inventive method of measuring a surface of an object on the basis of a block diagram.

In a provision step 50, a light plane is defined to generate a measurement light strip on the surface of an object.

In an image capturing step 52, real mapping locations of the measurement light strip are generated on a sensor in a quantization direction with a resolution limited by quantization and a direction perpendicular thereto.

In an evaluation step 54, effective mapping locations in the quantization direction are generated on the basis of the associated real mapping locations and at least one further real mapping location adjacent to the associated real mapping location in the direction perpendicular to the quantization direction.

According to an embodiment of the present invention, the number of additionally used further real mapping locations can be varied and/or fixedly adjusted, so as to be able to meet requirements regarding the measurement accuracy of the measurement system to be achieved.

Figure 9:
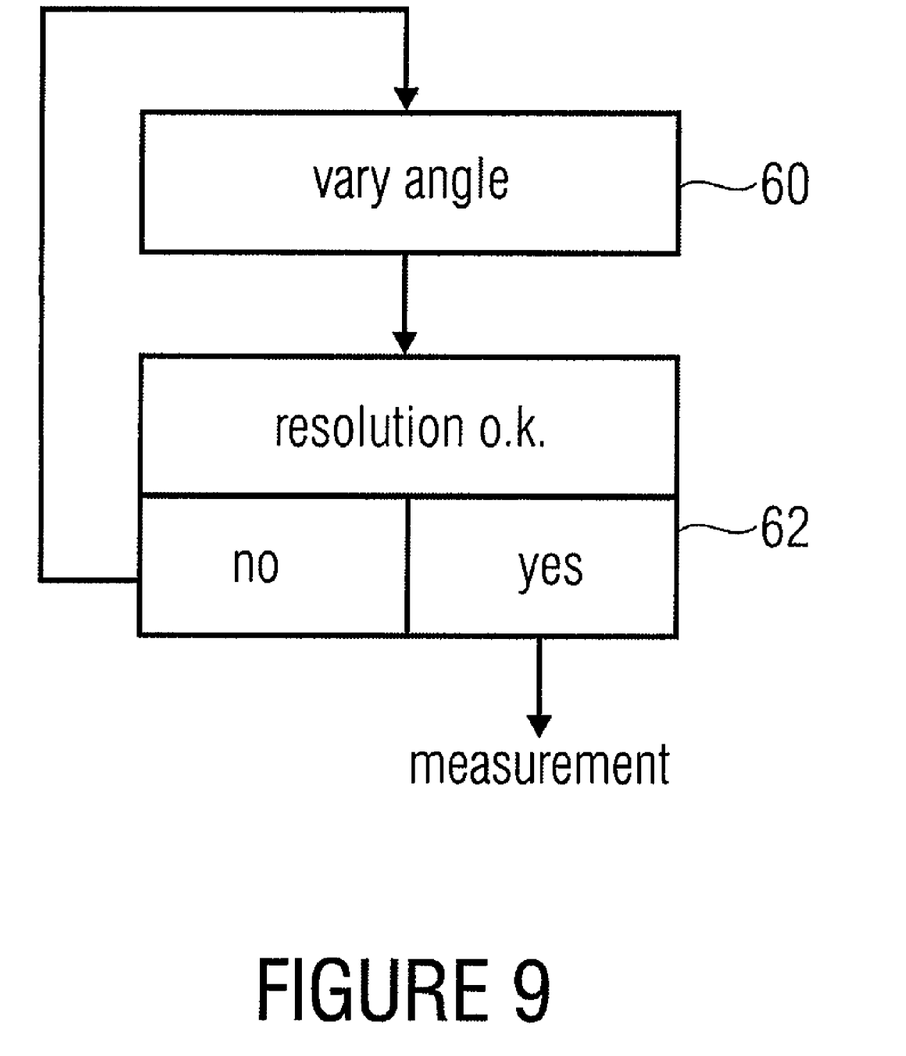
FIG. 9 is a block diagram of a method of improving the resolution of a measurement system and of measuring the surface of an object, according to the invention.

On the basis of a block diagram, FIG. 9 shows an example of a method for improving the resolution of a light-slit measurement system.

In a variation step 66, an angle between a mapping direction of the measurement light strip on the sensor and a quantization direction of the sensor is varied. In a checking step 62, it is checked as to whether the resolution lies within a predetermined resolution interval or not. If this is not the case, the variation step 60 is performed again so as to vary the angle 38 further. If it is determined that the resolution is within the predetermined resolution interval, the inventive method of improving the resolution of a light-slit measurement system is ended, and the measurement of the surface topographies of objects to be examined may be commenced.

By applying the inventive concept and/or the inventive method and a corresponding apparatus, a clear increase in the measurement accuracy of digital 3D geometrical measurement systems is made possible. The increase in resolution to be expected is significant, particularly when measuring flat, i.e. laterally comparably little structured surfaces of objects.

The improvement produced as compared with the conventional results from the increase in the height resolution, and thereby the measurement accuracy, of the digital 3D geometrical measurement systems from 1:1,000 to 1:10,000, for example, i.e. the sampled height measurement range can be detected with substantially higher measurement accuracy.

Although the inventive concept has been described on the basis of the example of a light-slit measurement method in the preceding paragraphs, the application of the inventive concept is not limited to such light-slit measurement methods.

Rather, the resolution of any other methods can be increased by applying the inventive concept, if these are digitizing and/or generate measurement values quantized in a measurement direction. This may, for example, be the case in X-ray measurement methods, among other things, which are performed by means of matrix sensors or sensors segmented otherwise, such as an array of drift chambers or counter tubes. The inventive method of controlling the resolution may also be performed on a computer. Here, it is not necessary to vary the variation of the angle between the mapping direction and the quantization direction of a quantizing sensor in a real manner. The variation may rather also be simulated, in order to predict an optimum angle.

Not only the CCD or CMOS sensors discussed on the basis of the preceding examples are considered as sensors for optical light-slit measurement methods. Rather, any other detector type having a quantizing mapping property can be used. This may, for example, also be photo multiplayer arrays coupled by means of optical fibers, which in turn are combined to a fiber array.

Depending on the conditions, the inventive method of measuring a surface of an object or the method of improving the resolution of a light-slit measurement system may implemented in hardware or in software. The implementation may be on a digital storage medium, particularly a disk or CD with electronically readable control signals capable of cooperating with a programmable computer system so that the inventive method of measuring the surface of an object or the method of improving the resolution of a light-slit measurement system is executed. In general, the invention thus also consists in a computer program product having program code stored on a machine-readable carrier for performing the inventive method, when the computer program product is executed on a computer. In other words, the invention may thus also be realized as a computer program having program code for performing the method, when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An optical measurement system for measuring a surface of an object, comprising:
a definer for defining a radiation plane, in order to generate a measuring strip on the surface of the object;
a matrix sensor with a resolution limited in a quantization direction by quantization, in order to acquire real mapping locations of the measuring strip on the sensor in the quantization direction and a direction perpendicular thereto, by making a capture of the measurement strip generated on the surface, wherein height information is determined on the surface of the object in the quantization direction, and the radiation plane is geometrically arranged with respect to the quantization direction so that real mapping locations on the sensor adjacent to each other in the direction perpendicular to the quantization direction correspond to different height information on the surface of the object;
an evaluator formed to acquire an effective mapping location in quantization direction on the basis of the associated real mapping location and at least one further real mapping location adjacent to the associated real mapping location in the direction perpendicular to the quantization direction; and
a resolution improver formed to increase a height resolution of the optical measurement system by varying an angle between a mapping direction of the measurement strip on the sensor and the quantization direction.

2. The optical measurement system according to claim 1, wherein the evaluator is formed to acquire the effective mapping location on the basis of a number of further real adjacent mapping locations adjacent to the real mapping location in the direction perpendicular to the quantization direction.

3. The optical measurement system according to claim 1, wherein the evaluator is formed to acquire the effective mapping location by averaging the associated real mapping location and the further real mapping locations.

4. The optical measurement system according to one of the preceding claims, wherein the matrix sensor is formed to acquire, as real mapping locations in quantization direction, the coordinates of that matrix sensor element comprising maximum intensity in quantization direction in a fixed direction perpendicular to the quantization direction.

5. The optical measurement system according to claim 1, wherein the resolution improver formed to vary the angle between the mapping direction and the quantization direction so that the mapping direction is non-perpendicular to the quantization direction.

6. The optical measurement system according to claim 5, wherein the resolution improver is formed to perform variation of an orientation of the radiation plane.

7. The optical measurement system according to claim 6, wherein the resolution improver is formed to mechanically move definer.

8. The optical measurement system according to claim 5, wherein the resolution improver comprises a mover to mechanically move the object.

9. The optical measurement system according to claim 5, wherein the resolution improver comprises a sensor mover to perform variation of the orientation of the quantization direction of the sensor.

10. The optical measurement system according to claim 5, additionally comprising a calibrator formed to determine the angle so that, in the case of an object with a planar surface, the effective mapping location acquired lies within a predetermined interval around a physical mapping location of the measurement strip on the sensor.

11. The optical measurement system according to claim 10, wherein the calibrator is formed to control the resolution improver to vary the angle.

12. The optical measurement system according to claim 10, wherein the calibrator is formed to vary the number of neighboring real mapping locations used by the evaluator.

13. A method of measuring a surface of an object, comprising:
defining a radiation plane to generate a measurement strip on the surface of the object;
making a capture of the measurement strip generated on the surface, in order to generate real mapping locations of the measurement strip in a quantization direction and a direction perpendicular thereto at a resolution limited by quantization in a quantization direction, wherein height information is determined on the surface of the object in the quantization direction, and the radiation plane is geometrically arranged with respect to the quantization direction so that mapping locations on the sensor adjacent to each other in the direction perpendicular to the quantization direction correspond to different height information on the surface of the object;
acquiring effective mapping locations in quantization direction on the basis of an associated real mapping location and at least one further real mapping location adjacent to the associated real mapping location in the direction perpendicular to the quantization direction; and
increasing a height resolution of the optical measurement system by varying an angle between a mapping direction of the measurement strip on the sensor and the quantization direction.

14. A method according to claim 13, further comprising:
varying an angle between a mapping direction of the measurement strip on the matrix sensor and the quantization direction; and
checking as to whether the effective mapping location lies within an interval around a physical mapping location of the measurement strip.

15. The method according to claim 14, further comprising additionally:
varying a number of further adjacent real mapping locations.

16. An optical measurement system for measuring a surface of an object, comprising:
a definer for defining a radiation plane, in order to generate a measuring strip on the surface of the object;
a matrix sensor of sensors arranged in columns oriented along a first sensor axis, and rows oriented in a second sensor axis which extends orthogonal to the first axis, respectively, the matrix sensor being configured to acquire a stripe of real mapping locations of the measuring strip on the matrix sensor by making a capture of the measurement strip generated on the surface, and to determine a height profile of the surface of the object within the radiation plane by determining, per column, a row number of the row at which the stripe of real mapping locations crosses the respective column;
an evaluator formed to acquire an improved height profile on the basis of the height profile by averaging over the row numbers of at least two neighboring columns per column of the height profile; and
a resolution improver formed to increase a height resolution of the optical measurement system by varying an angle between a mapping direction along which the stripe of the real mapping locations extends on the sensor and the first sensor axis.

17. The optical measurement system according to claim 16, wherein the resolution improver is formed to vary the angle between the mapping direction and the quantization direction so that the mapping direction is non-perpendicular to the quantization direction.

* * * * *